June 30, 1953

R. B. JANNEY II
WATER PLANING UNDERCARRIAGE WITH
FLOTATION MEANS FOR AIRCRAFT 2,643,835

Filed July 11, 1950

INVENTOR
*Raymond B. Janney II.*

BY *Herbert M. Birch*

ATTORNEY

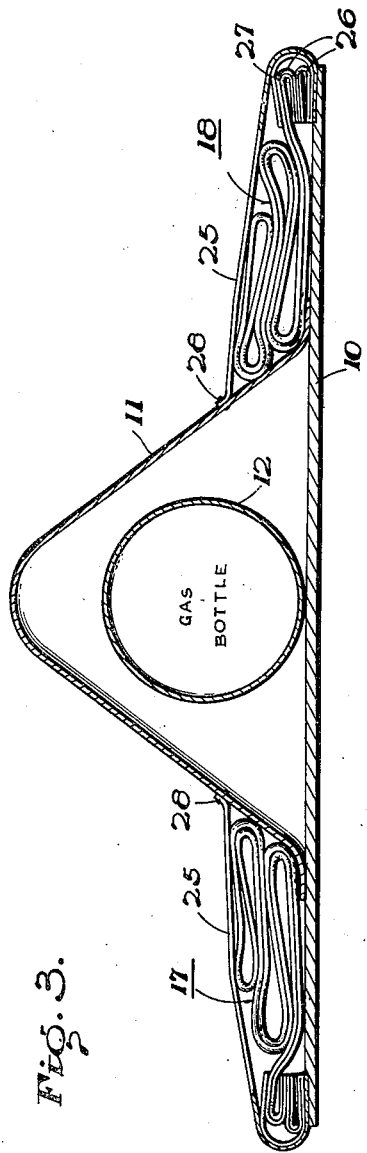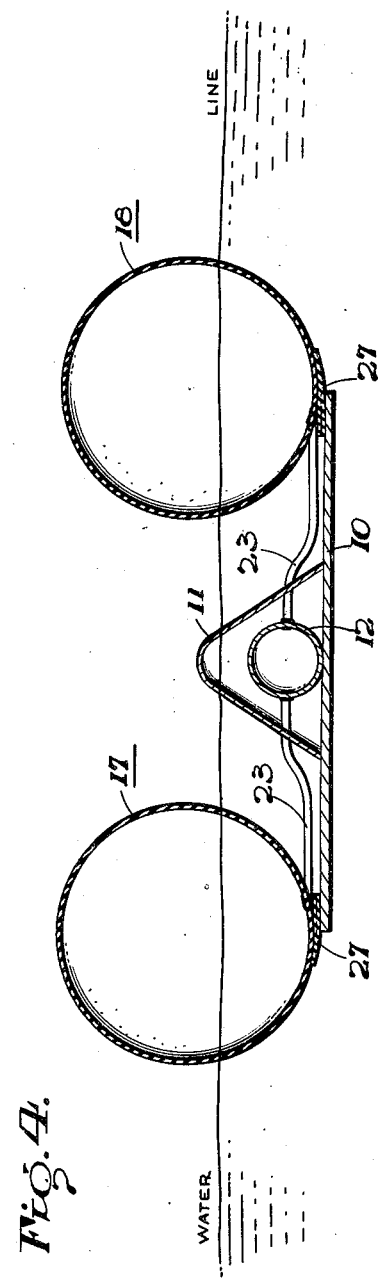

Patented June 30, 1953

2,643,835

UNITED STATES PATENT OFFICE 2,643,835

WATER PLANING UNDERCARRIAGE WITH FLOTATION MEANS FOR AIRCRAFT

Raymond B. Janney II, Wilmington, Del., assignor, by mesne assignments, to All American Engineering Company, Wilmington, Del., a corporation of Delaware Application July 11, 1950, Serial No. 173,094

6 Claims. (Cl. 244—107)

1

The present invention relates to water planing undercarriage for aircraft and more particularly to flotation means operatively associated therewith.

When aircraft planing undercarriages are used to land and take off from water a minimum planing velocity must be maintained or the aircraft will sink.

It is an object of the present invention to provide in conjunction with a water planing surface aircraft landing gear an inflatable and deflatable flotation means to prevent sinking.

Another object of the invention is to provide means for inflating flotation means attached to a water planing surface, said means being operated by the pilot of an aircraft.

Another object is to provide an arrangement for storing the flotation members in a deflated condition so that when inflated they automatically release themselves from their stored positions.

Another object is to provide in place of a pilot control a condition-responsive arrangement for inflating the flotation mechanism, whereby the mechanism may be inflated automatically.

A further object is to provide a novel water planing member formed with a hollow central housing in which is mounted a gas or air bottle and on each side of which are flotation bags connected to the bottle from the housing by hose connections adapted to transfer fluid from the bottle to inflate the bags.

Many other objects and advantages of the present invention will appear from the following detailed description, which refers by reference numerals to the several similarly numbered parts of the attached drawings, wherein:

Fig. 3 is a transverse cross section view of the device to show the gas bottle, housing therefor and the folded deflated flotation members.

Fig. 4 is a relatively reduced transverse cross sectional illustration of the device with the flotation means inflated.

Figure 1:
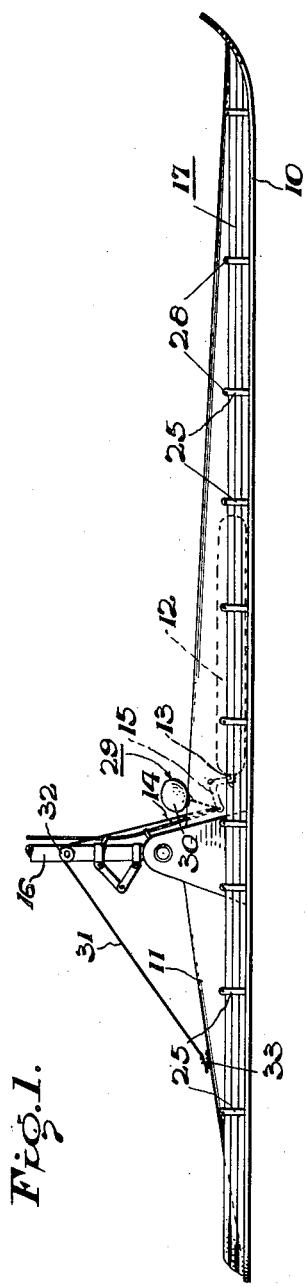
Figure 1 is a side elevation view of the water planing surface of an aircraft undercarriage and with flotation means folded in a deflated condition.
Figure 2:
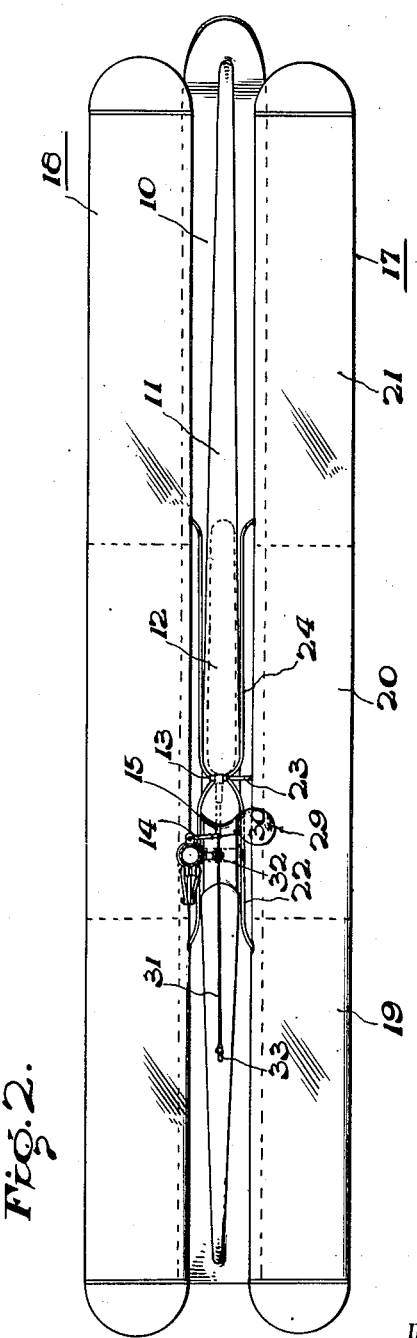
Fig. 2 is a top plan view of the device shown in Fig. 1.

Referring in details to the drawings, and first with particular reference to Figures 1 and 2, there is shown a water planing surface or hydro-ski 10 having an elongated rib or stiffener 11 extending centrally along on its upper surface. The rib 11 is hollow to provide a housing for a gas bottle 12 or the like, and closure means, not shown, may

2 be provided to permit placement and replacement of the bottle 12 within the housing, although the bottle may be mounted elsewhere.

The bottle 12 is formed with a valve closure and connection generally referred to by numeral 13. The valve may be actuated to release gas or fluid from the bottle 12 by a linkage 14 connected to a bell-crank lever 15 from the valve. The linkage 14 extends from the bell-crank 15 along a landing strut 16 of the aircraft undercarriage to some convenient location in the fuselage for the pilot to operate.

On each side of the rib 11 and normally when deflated resting upon the top side surface of the hydro-ski 10 are flotation members 17 and 18, see Figure 3. Each of these members are the same and preferably comprise a plurality of inflatable compartments 19, 20 and 21. These compartments receive fluid pressure from the reservoir bottle 12 through hose conduits 22, 23 and 24 leading to each compartment of the members 17 and 18, see Figure 2.

In Fig. 3 the flotation members 17 and 18 are shown folded and deflated in stored position. They are held stored by a strap or straps 25 anchored at one end to the outer edge top surface of the ski 10 by a double clip 26 which also anchors the flotation means. Each flotation member has a securing tab 27 held by the clip. The free end of the storing strap 25 is made with a detachable fastener, such as a heavy snap fastener 28, which cooperates with its other part fixed to the rib 11.

When the fastener is snapped closed it holds its flotation member in folded stored position, but upon inflation thereof the snap connection is automatically released by pressure from the unfolding and inflating flotation members and said members when inflated will serve to float the undercarriage as illustrated in Figure 4.

There are many arrangements which may be used to operate the valve of the bottle 12 in addition to a pilot control linkage as illustrated. Actuation of the valve may be made automatic by connection to a water speed indicator or water level indicator which will cause the members 17 and 18 to inflate if the speed is too low or the water level is too high. For example, in connection with water level control float type release 29 connected to the bell crank 15 will actuate the valve 13 to vent gas from bottle 12 into bags 17 and 18 when the water level is high enough to float the buoyant object 30. This does not interfere with pilot operation through primary release linkage 14.

For example, in connection with speed control, pitch sensitive automatic release can be actuated from the same bell crank through flexible linkage 31 over pulley 32, linkage being connected to the planing surface or the hydro-ski at lug 25 so that a limiting nose-up pitch or angle of attack of the planing surface or hydro-ski (relative to strut fixed with respect to the aircraft) will put tension in the flexible linkage to actuate the valve 13 through the bell crank 15. Since the pitch or angle of attack is a function of the water speed, this linkage is also a water speed sensitive automatic release. This linkage also does not interfere with the pilot operation through the primary release linkage 14.

Also, the gas or air bottle 12 may be mounted in any convenient location on the airplane with appropriate air hose connections to the flotation means.

Without further description it is believed that the present invention may be clearly understood by others so that authorized practice thereof is possible. While the invention has been described specifically for only one form thereof, it is to be expressly understood that other arrangements and combinations of the parts now likely to occur to others skilled in the art, are likewise to be considered a part hereof. To determine the scope of the invention reference should be had to the appended claims.

What is claimed is:

1. In combination with an aircraft undercarriage equipped with water planing landing members, said members having storage space on each of their respective upper surfaces for inflatable flotation means, formed with a plurality of separate compartments, a housing formed from the upper surface of said members between the storage spaces, a fluid pressure reservoir in said housing, an outlet valve forming a closure for said reservoir, said valve having a plurality of outlet connections, a fluid transfer hose connected with each outlet connection from one of each of the compartments of said flotation means, flexible means for tethering said flotation means to said upper surface of said members, and quick-detachable holders for said flotation members while they are deflated adapted to be released by said members as they inflate.

2. An aircraft undercarriage including elongated planing surfaces having a longitudinally centrally extending reinforcing hollow rib serving as a housing, a fluid pressure reservoir in the housing, a lever controlled outlet valve in the reservoir, a flexible tube leading from an opening in the top wall of the housing from said valve, said tube being connected to an inflatable bag connected to each planing surface, and operating means connected to said valve lever to open the valve and inflate the bag of each planing surface.

3. Flotation means for aircraft undercarriage equipped with hydro-skis, comprising an inflatable bag secured to each side of one of the hydroskis, each of said bags being formed with a plurality of compartments separately inflatable, a fluid pressure reservoir adapted to supply inflating pressures to said bags, a water level controlled valve on said reservoir, a water level responsive means connected to said valve, and a flexible hose coupling from said valve to each of the said bags.

4. In combination with an aircraft undercarriage equipped with water planing landing members, said members having storage space on each of said respective upper surfaces for inflatable flotation means, formed with a plurality of separate compartments, a housing formed from the upper surface of said members between the storage spaces, a fluid pressure reservoir in said housing, an outlet valve forming a closure for said reservoir, said valve having a plurality of outlet connections, a fluid transfer hose connected with each outlet connection from one of each of the compartments of said flotation means, flexible means for tethering said flotation means to said upper surface of said members, quick-detachable holders for said flotation members while they are deflated adapted to be released by said members as they inflate, and a buoyant object connected to said outlet valve adapted to open said valve when the water level above the respective water planing landing members is high enough to float said buoyant object.

5. An aircraft undercarriage including elongated planing surfaces having a longitudinally centrally extending reinforcing hollow rib serving as a housing, a fluid pressure reservoir in the housing, a lever controlled outlet valve in the reservoir, a flexible tube leading from an opening in the top wall of the housing from said valve, said tube being connected to an inflatable bag connected to each planing surface, operating means connected to said valve lever to open the valve and inflate the bag of each planing surface, and planing surface angle of attack responsive means connected to said valve lever for opening the valve to bag inflating position.

6. In combination with an aircraft undercarriage equipped with water planing landing members, said members having storage space on each of their respective upper surfaces for inflatable flotation means formed with a plurality of separate compartments, a housing formed from the upper surface of said members between the storage spaces, a fluid pressure reservoir in said housing, an outlet valve forming a closure for said reservoir, said valve having a plurality of outlet connections, a fluid transfer hose connected with each outlet connection from one of each of the compartments of said flotation means, flexible means for tethering said flotation means to said upper surface of said members, quick-detachable holders for said flotation members while they are deflated adapted to be released by said members as they inflate, said outlet valve having an operating lever, and a hydro-ski pitch sensitive release means connected to said valve lever and a part of said hydro-ski, whereby a predetermined nose-up pitch of the hydro-ski will operate the valve to open position to inflate the bags.

RAYMOND B. JANNEY II.

References Cited in the file of this patent

UNITED STATES PATENTS

| Number | Name | Date |
|---|---|---|
| 996,362 | Rectenwald | June 27, 1911 |
| 1,060,531 | Bond | Apr. 29, 1913 |
| 1,501,530 | Driggs | July 15, 1924 |
| 2,507,913 | Lanser | May 16, 1950 |

FOREIGN PATENTS

| Number | Country | Date |
|---|---|---|
| 1,713 | Great Britain | of 1912 |
| 10,481 | Great Britain | of 1915 |
| 802,024 | France | May 30, 1936 |